(12) United States Patent
Saes et al.

(10) Patent No.: US 11,122,662 B2
(45) Date of Patent: *Sep. 14, 2021

(54) MODULAR LIGHTING APPLICATION

(71) Applicant: Eldolab Holding B.V., Eindhoven Son en Breugel (NL)

(72) Inventors: Marc Saes, Eindhoven (NL); Tijs Versteegde, Eindhoven (NL); Stephen Haight Lydecker, Snellville, GA (US)

(73) Assignee: ELDOLAB HOLDING B.V., Son en Breugel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,217

(22) Filed: Jun. 3, 2020

(65) Prior Publication Data

US 2020/0296813 A1 Sep. 17, 2020

Related U.S. Application Data

(63) Continuation of application No. 16/083,003, filed as application No. PCT/NL2017/050157 on Mar. 13, 2017, now Pat. No. 10,694,601.

(30) Foreign Application Priority Data

Mar. 11, 2016 (NL) ..................................... 2016424

(51) Int. Cl.
*H05B 45/14* (2020.01)
*H05B 45/48* (2020.01)
(Continued)

(52) U.S. Cl.
CPC ............. *H05B 45/48* (2020.01); *H05B 45/14* (2020.01); *H05B 45/20* (2020.01); *H05B 45/24* (2020.01);
(Continued)

(58) Field of Classification Search
CPC ............ H05B 33/0815; H05B 33/0827; H05B 33/083; H05B 33/0845; H05B 45/14;
(Continued)

(56) References Cited

U.S. PATENT DOCUMENTS 8,638,045 B2 * 1/2014 Kunst .................. H05B 45/385
315/291
8,643,284 B2 * 2/2014 Welten ................. H05B 45/375
315/123
(Continued)

FOREIGN PATENT DOCUMENTS

DE 10200803065 A1 8/2009
DE 102010000672 A1 7/2011

OTHER PUBLICATIONS

Entire patent prosecution history of U.S. Appl. No. 16/083,003, filed Sep. 7, 2018, entitled, "Modular Lighting Application."

*Primary Examiner* — Tung X Le
(74) *Attorney, Agent, or Firm* — RatnerPrestia

(57) ABSTRACT

A modular system comprising a first component comprising an LED driver and is second component comprising a light engine is described. —the LED driver comprising: a switched mode power converter configured to output a supply current; a first control unit configured to control a switch of the switched mode power converter, thereby controlling the supply current; —the light engine comprising: an LED assembly configured to receive the supply current, the LED) assembly comprising a plurality of LEDs and one or more switches arranged in series or in parallel, with one or more LEDs of the plurality of LEDs, and a second control unit configured to control the one or more switches of the LED assembly, thereby controlling an LED current through the plurality of LEDs; wherein the first control unit is configured to control an amplitude of the supply current, the second control unit is configured to
(Continued)

control a duty cycle of the LED current through the plurality of LEDs and wherein the first and second control unit are configured to synchronize to switching operation of the switch of the switched mode power converter with a switching operation of the one or more switches of the light engine.

22 Claims, 7 Drawing Sheets

(51) Int. Cl.
*H05B 45/20* (2020.01)
*H05B 45/24* (2020.01)
*H05B 45/44* (2020.01)
*H05B 45/3725* (2020.01)
*H05B 45/375* (2020.01)

(52) U.S. Cl.
CPC ......... *H05B 45/3725* (2020.01); *H05B 45/44* (2020.01); *H05B 45/375* (2020.01)

(58) Field of Classification Search
CPC ........ H05B 45/20; H05B 45/24; H05B 45/37; H05B 45/44; H05B 45/48
USPC .................................. 315/192, 193, 297, 312
See application file for complete search history.

(56) References Cited

U.S. PATENT DOCUMENTS

| | | | |
|---|---|---|---|
| 9,648,679 B2* | 5/2017 | Murakami | F21S 41/148 |
| 2004/0090189 A1 | 5/2004 | Yoneda et al. | |
| 2006/0022214 A1 | 2/2006 | Morgan et al. | |
| 2007/0188425 A1 | 8/2007 | Saccomanno | |
| 2007/0244366 A1 | 10/2007 | Murata | |
| 2007/0285378 A1 | 12/2007 | Lankhorst et al. | |
| 2008/0116818 A1 | 5/2008 | Shteynberg et al. | |
| 2009/0284172 A1 | 11/2009 | Maschietto et al. | |
| 2011/0109247 A1 | 5/2011 | Hoogzaad et al. | |
| 2011/0163680 A1 | 7/2011 | Welten | |
| 2012/0187845 A1 | 7/2012 | Saes et al. | |
| 2013/0049599 A1 | 2/2013 | Logiudice | |
| 2013/0099684 A1* | 4/2013 | Cheng | H05B 47/10 315/186 |
| 2013/0207559 A1 | 8/2013 | Ferrier | |
| 2013/0313973 A1* | 11/2013 | DeNicholas | H05B 45/48 315/122 |
| 2013/0313987 A1 | 11/2013 | Chu et al. | |
| 2014/0265890 A1 | 9/2014 | Ito et al. | |
| 2014/0285092 A1* | 9/2014 | Knoedgen | H05B 47/19 315/151 |
| 2016/0374166 A1 | 12/2016 | Chen et al. | |

* cited by examiner

MODULAR LIGHTING APPLICATION

RELATED APPLICATIONS

This application is a Continuation Application of U.S. application Ser. No. 16/083,003, filed Sep. 7, 2018, which is a U.S. National Phase Patent Application of International Application No. PCT/NL2017/050157, filed Mar. 13, 2017, which claims priority to Netherlands Application No. NL 2016424, filed Mar. 11, 2016, the disclosures of which are entirely incorporated herein by reference.

The invention relates to the field of lighting applications, in particular LED based lighting applications.

BACKGROUND OF THE INVENTION

The present invention relates to LED based lighting applications. Typically, such lighting application comprise a power source or power converter that is configured to supply a current to an LED assembly comprising one or more LEDs. In known applications, LEDs producing light of different colors are often combined, in order to realize a light source having an adjustable color output. In order to realize such an adjustable color output, the relative intensities of LED of different color are adjusted, e.g. by operating the LEDs of different color at different duty cycles.

In general, an intensity of an LED based lighting application may be adjusted by adjusting the amplitude of the current through the LED or by operating the LED at an adjustable duty cycle. In the latter case, the current through the LED may be reduced to a lower value, e.g. zero during a particular percentage of the time, thus reducing the average intensity. Such process, also referred to as duty cycle dimming, is performed at a comparatively high frequency that is not visible for the human eye or which cannot be perceived by cameras or the like either.

At present, LED assemblies and power sources for driving the LED assemblies, also referred to as LED drivers, are strongly linked. As such, it may be cumbersome to combine an LED driver with different LED assemblies. Typical problems that may e.g. arise are the incapability of an LED driver to address multiple groups of LEDs in an LED assembly or to attain or influence certain visual effects.

SUMMARY OF THE INVENTION

It would be desirable to provide in LED based lighting applications having an improved flexibility and modularity.

To better address these concerns, in a first aspect of the invention, there is provided a modular system comprising a first component comprising an LED driver and a second component comprising a light engine;
the LED driver comprising:
a switched mode power converter configured to output a supply current;
a first control unit configured to control a switch of the switched mode power converter, thereby controlling the supply current;
the light engine comprising:
an LED assembly configured to receive the supply current, the LED assembly comprising a plurality of LEDs and one or more switches arranged in series or in parallel with one or more LEDs of the plurality of LEDs, and
a second control unit configured to control the one or more switches of the LED assembly, thereby controlling an LED current through the plurality of LEDs; wherein the first control unit is configured to control an amplitude of the supply current, the second control unit is configured to control a duty cycle of the LED current through the plurality of LEDs and wherein the first and second control unit are configured to synchronize a switching operation of the switch of the switched mode power converter with a switching operation of the one or more switches of the light engine.

According to another aspect of the present invention, there is provided a modular system comprising a first component comprising an LED driver and a second component comprising a light engine;
the LED driver comprising:
a switched mode power converter configured to output a supply current;
a first control unit configured to control a switch of the switched mode power converter, thereby controlling the supply current;
the light engine comprising:
an LED assembly configured to receive the supply current, the LED assembly comprising a plurality of LEDs and one or more switches arranged in series or in parallel with one or more LEDs of the plurality of LEDs, and
a second control unit configured to control the one or more switches of the LED assembly, thereby controlling an LED current through the plurality of LEDs;
the system further comprising a main control unit configured to:
receive, at an input terminal, a set point representing a desired illumination characteristic of the LED assembly;
determine, based on the received set point, a current amplitude modulation scheme and a duty cycle modulation scheme;
provide a first output signal representative of the current amplitude modulation scheme to the first control unit and a second output signal representative of the duty cycle modulation scheme to the second control unit;
wherein the first and second control unit are respectively configured to apply the current amplitude modulation scheme and the duty cycle modulation scheme within a modulation time window, in order to generate the desired illumination characteristic.

According to yet another aspect of the present invention, there is provided a light engine comprising:
an LED assembly configured to receive a supply current from an LED driver, the LED assembly comprising a plurality of LEDs and one or more switches arranged in series or in parallel with one or more LEDs of the plurality of LEDs, and
a control unit configured to control the one or more switches of the LED assembly, thereby controlling an LED current through the plurality of LEDs;
the control unit further being configured to:
receive, at an input terminal, a set point representing a desired illumination characteristic of the LED assembly;
determine, based on the received set point, a current amplitude modulation scheme and a duty cycle modulation scheme;
output a first output signal representative of the current amplitude modulation scheme for processing by an LED driver control unit of the LED driver;
wherein the current amplitude modulation scheme represents an amplitude of the supply current to be provided by the LED driver as a function of time within a modulation time window and the duty cycle modulation scheme represents switching operations for the one or more switches as a function of time within the modulation time window and wherein the current amplitude modulation scheme and the duty cycle modulation scheme are configured to, when applied by the LED driver control unit and the control unit, to generate the desired illumination characteristic.

According to yet another aspect of the present invention, there is provided an LED driver comprising:
a switched mode power converter configured to output a supply current for powering an LED assembly:
a control unit configured to control a switch of the switched mode power converter, thereby controlling the supply current;
wherein the control unit is further configured to:
receive, at an input terminal of the control unit, LED assembly information describing the LED assembly to be powered;
receive, at the input terminal, a set point representing a desired illumination characteristic to be generated, during use, by the LED assembly;
determine, based on the received set point, a current amplitude modulation scheme and a duty cycle modulation scheme;
output a first output signal representative of the duty cycle modulation scheme for processing by an LED assembly control unit of the LED assembly that is to be powered;
wherein the current amplitude modulation scheme represents an amplitude of the supply current to be provided by the LED driver as a function of time within a modulation time window and the duty cycle modulation scheme represents switching operations for the LED assembly as a function of time within the modulation time window and wherein the current amplitude modulation scheme and the duty cycle modulation scheme are configured to, when applied by the LED assembly control unit and the control unit, to generate the desired illumination characteristic.

According to yet another aspect of the present invention, there is provided a modular system comprising a first component comprising an LED driver and a second component comprising a light engine;
the LED driver comprising:
a switched mode power converter configured to output a supply current;
a first control unit configured to control a switch of the switched mode power converter, thereby controlling the supply current;
the light engine comprising:
an LED assembly configured to receive the supply current, the LED assembly comprising a plurality of LEDs or LED groups and one or more switches arranged in series or in parallel with one or more LEDs or LED groups of the plurality of LEDs of LED groups, and
a second control unit configured to control the one or more switches of the LED assembly, thereby controlling a supply of the supply current to the plurality of LEDs or LED groups of the LED assembly; wherein
the first control unit and the second control unit are configured to co-operate and control the supply current and the supply of the supply current to the LED assembly in accordance with a desired illumination characteristic, and wherein the first and second control unit are configured to synchronize a switching operation of the switch of the switched mode power converter with a switching operation of the one or more switches of the light engine.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
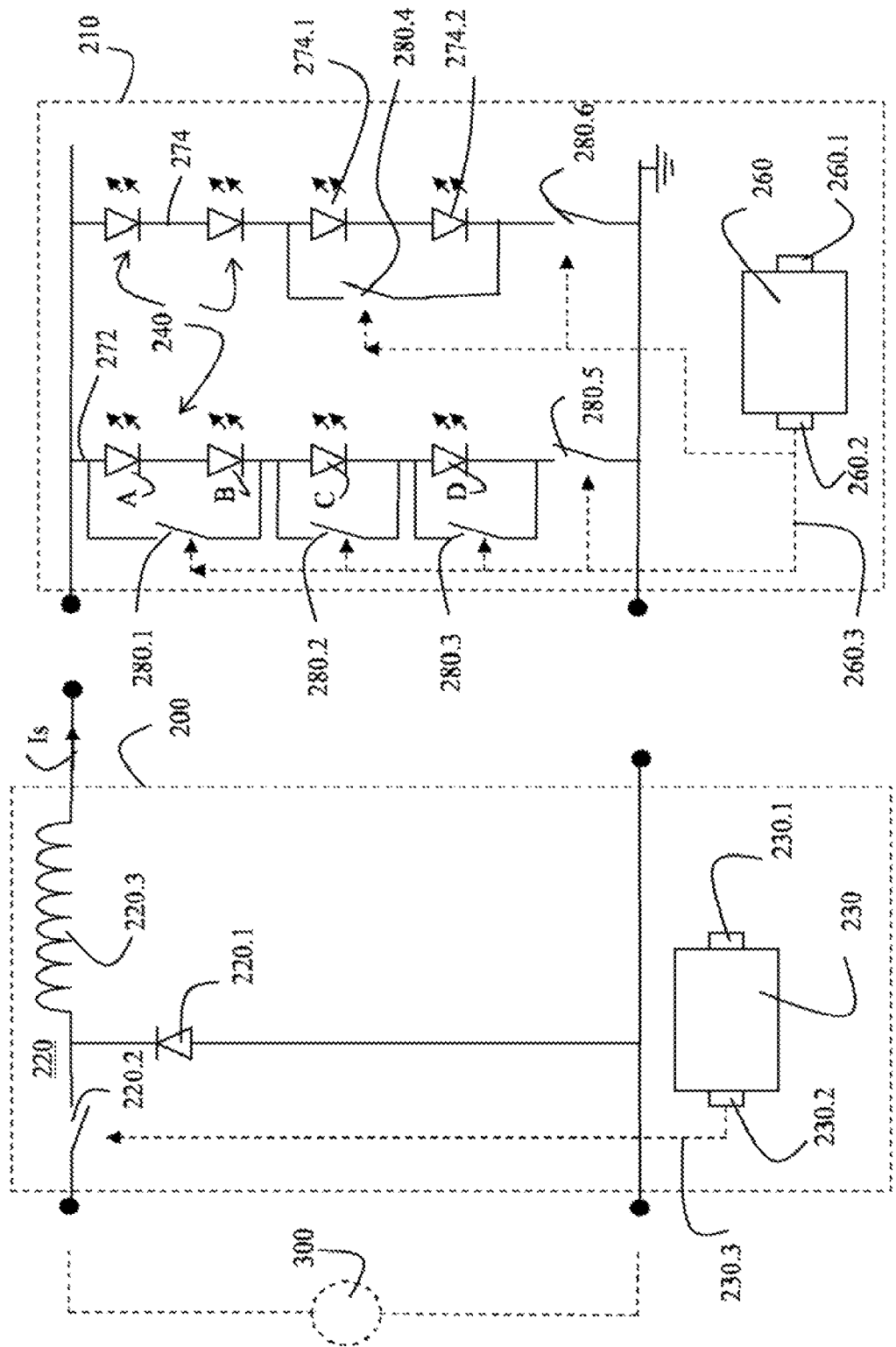
FIG. 1 depicts a combination of an LED driver and light engine according to a first embodiment of the present invention.

FIG. 1 depicts a modular system according to an embodiment of the present invention. The modular system as schematically shown comprises a first component 200, i.e. an LED driver and a second component 210, i.e. a light engine.

Within the meaning of the present invention, light engine refers to a combination of an LED assembly and associated switches for controlling a current through the LEDs of the LED assembly. In general, the LED assembly may comprise a plurality of LEDs arranged in a variety of topologies. Further, the topology of the LEDs of the LED assembly may also be adjustable by means of switches, thereby e.g. changing a topology of two LEDs connected in series to a topology whereby the LEDs are connected in parallel.

In accordance with the present invention, a light engine may further comprise a control unit or controller for controlling an operating state of the switches of the light engine.

Within the meaning of the present invention, an LED driver comprises a switched mode power converter (SMPC) and a control unit for controlling the switched mode power converter, in particular a switch, but not limited to, of the switched mode power converter.

In the embodiment as shown, the LED driver 200 comprises a switched mode power converter (SMPC) 220 and a first control unit 230 for controlling the switched mode power converter (SMPC).

In accordance with the present invention, various switched mode power converters may be applied such as Buck, Boost, Buck-Boost or hysteretic converters. In the embodiment as shown, the SMPC is a Buck converter 220 including a diode 220.1 a power switch 220.2 and an energy storage element 220.3, i.e. an inductance. Typically, such converters comprise a switch such as switch 220.2 as shown, for controlling an output current Is as supplied by the SMPC. In an embodiment, the SMPC 220 may e.g. be powered via a rectified DC supply voltage 300.

In the embodiment as shown, the light engine 210 is a separate component comprising an LED assembly 240, a plurality of switches 250 for controlling whether or not a current flows through the LEDs and a control unit 260 for controlling the switches. In the embodiment as shown, the LEDs of the LED assembly 240 are arranged in two parallel branches 272, 274. The first branch 272 comprises three groups (group 1 comprising LEDs A and B, group 2 comprising LED C and group 3 comprising LED D) that are arranged in series, each group further having an associated switch 280.1, 280.2, 280.3 for controlling the current through the LED group. The LED assembly further comprises a second branch 274 comprising 4 LEDs, whereby LEDs 274.1 and 274.2 can be shorted by switch 280.4. Switches 280.5 and 280.6 control whether or not a current can be supplied to the respective branches 272 and 274.

Note that in practice, for the topology as schematically shown in FIG. 1, either one of the switches 280.5 or 280.6 should be closed. In case both switches would be open, the current path would not be closed. It may further be noted that, in case a plurality of parallel branches is applied in the LED assembly, it may be preferred to ensure that, at each instant in time, only one serial switch such as switches 280.5 or 280.6 is closed. By doing so, one can be sure that the entire current as supplied by the LED driver 200 is provided to the selected branch. In case more than one serial switch would be closed at the same time, the supply current Is would have to be distributed over the selected branches, i.e. the branches who's switches are closed.

Note however that, in case multiple parallel branches are connected to the supply current, measures may be taken to ensure proper control of the current in each of the branches, thus enabling the applied currents to result in a desired illumination set point. As an example of such measures, a current equalisation may e.g. be done using current mirror circuits in which a current dictating branch is set to a current Is divided by the number or connected parallel branches and whereby multiple mirror branches are used to source or sink the current through each of the connected parallel branches.

In accordance with an aspect of the present invention, the controlling of the SMPC, i.e. the power converter 220 of the LED driver 200 and of the switches 280.1-280.6 as applied in the light engine 210 is performed by separate control units.

Within the meaning of the present invention, a control unit or controller may e.g. be embodied as a microprocessor or processor or any other type of control circuitry. In general, such a control unit may comprise an input terminal 230.1, 260.1 for receiving command signals such as a user defined illumination set point, i.e. an input signal (e.g. provided via a user interface) representing a desired illumination characteristic of the LED assembly. In an embodiment, such a desired illumination characteristic may e.g. include a desired intensity and a desired color of the light as generated by the LED assembly of the light engine or a certain ratio between the intensities or colors of multiple channels or branches, or a dynamic sequence of such ratios, e.g. resulting in a light show. A control unit or controller may further comprise a processing unit for processing the commands or input signals and e.g. a memory unit for storage of data. A control unit or controller further typically has one or more output terminals 230.2, 260.2 for outputting control signals, e.g. for controlling an electronic switch of the SMPC (indicated by the dotted line 230.3) or controlling a switch of the light engine (indicated by the dotted line 260.3).

In a system as schematically shown in FIG. 1, a desired illumination characteristic to be emitted by the LEDs of the LED assembly 240 can be realized as follows:

In order to realize a desired illumination characteristic, e.g. a particular color at a particular intensity, the current as provided by the SMPC 220 can be modulated, i.e. the amplitude can be adjusted and the duty cycle of the current through the different LEDs or LED groups of the LED assembly can be adjusted, by switching of the switches 280.1 to 280.6.

In such embodiment, the control unit 230 thus controls the SMPC 220, thereby controlling the amplitude of the supply current Is as provided by the LED driver to the light engine, whereas the control unit 260 may be configured to control the switches 280.1 to 280.6.

In such a modular system as schematically shown in FIG. 1, a variety of control strategies may be implemented.

As a first example, in an embodiment of the present invention, the second control unit 260 may act as the master control unit. In such embodiment, the second control unit 260 may e.g. receive at an input terminal, e.g. terminal 260.1, a set point representing a desired illumination characteristic.

As a second example, in an embodiment of the present invention, the first control unit 230 may act as the master control unit. In such embodiment, the first control unit 230 may e.g. receive at an input terminal, e.g. terminal 230.1, a set point representing a desired illumination characteristic.

As a third example, in an embodiment of the present invention, the system may comprise a separate master control unit (not shown) that is configured to receive, a set point representing a desired illumination characteristic and, upon receipt of such a set point, process the set point and output commands to both the first and second control units, e.g. to the respective input terminals 230.1 and 260.1 of the first and second control units 230, 260. Regarding the third example, it may further be mentioned that, in an embodiment, either the first or second control unit could be implemented as part of the master control unit or the master control unit could be implemented as a part or component of either the LED driver or the light engine.

As a fourth example, the first and second control units may have been designed to inter-operate such that they jointly execute an algorithm defining the desired operations of the LED driver, in particular of the SMPC of the LED driver, and the LED assembly, in particular of the switches of the LED assembly, each control unit thus having a different but mutually complimentary role.

In an embodiment of the present invention, the desired illumination characteristic is realized by appropriate switching and control of the current during a time interval or time window referred to as the modulation time window. In an embodiment, the modulation time window is an interval, a particular period during which all required switching actions and amplitude modulations of the current of the SMPC can be grouped, in order to realize the desired illumination characteristic. Phrased differently, the average intensity of the LEDs of the LED assembly during the modulation time window is such that it corresponds to the desired intensity; the same holds for the desired color as indicated by the desired Illumination characteristic. By selecting the modulation time window sufficiently small, an observer will not notice the actual modulation of the current or the switching of different LEDs or LED groups during the modulation time window. In such embodiment, the switching operations as performed during the modulation time window are consecutively repeated unit a new desired illumination set point or characteristic is desired. Note that, in case of a light show or a particular lighting effect that includes a gradual, substantially continuous change in an intensity and/or a color of the generated illumination, a required intensity or color change may be accommodated within the modulation time window as well.

In an embodiment, the modulation time window may have a duration of 3.3 msec or a multiple thereof. In an embodiment, the modulation time window is sub-divided in multiple sub-windows whereby during each sub-window, a particular purpose or task is aimed for. In such embodiment, one may e.g. arrange that each LED or LED group of the LED assembly of the light engine is only operated in one sub-window. In an embodiment of the present invention, the particular purposes or tasks as performed during the sub-windows are such that, the combination of the tasks performed during the modulation time window results in the realisation of an overall purpose being achieved, the overall purpose e.g. being the realisation of a desired illumination characteristic, e.g. a desired color and intensity characteristic as represented by a set point.

The sub-windows as applied may have a variable length or may have a fixed length.

In an embodiment, a modulation time window of 3.3 msec is subdivided in 8 sub-windows of 416 μsec.

In an embodiment, the implementation of the required control of the SMPC and of the switches of the LED assembly can be as follows:

In a first step, a set point or command representing a desired illumination characteristic is received by the control unit acting as master control unit, i.e. either the first or second control unit or a dedicated master control unit.

Upon receipt of the set point or command, the control unit acting as master control unit may be configured to determine, based on the desired illumination characteristic, a current amplitude modulation scheme and a duty cycle modulation scheme.

In accordance with an embodiment of the present invention, the current amplitude modulation scheme represents the amplitude of the current as supplied by the SMPC as a function of time and the duty cycle modulation scheme represents the required switching operations for the switches of the LED assembly. Note that, in an embodiment, the current amplitude modulation scheme may consist of a sequence of non-zero current values to be supplied by the SMPC, see e.g. FIG. 2 below. However, in an embodiment, the switched mode power converter as applied in an LED driver as applied in the present invention, may be operated in a pulsed mode as well, whereby the current as supplied may be zero for a percentage of the time. Such an operation of the SMPC may e.g. be referred to as pulse modulation and may be advantageously applied in case a comparatively low intensity of light is desired. In such case, e.g. where an intensity of less than 50% of the nominal intensity is required, it may be advantageous the 'shut down' the SMPC for half the time rather than maintaining the current towards the light engine and applying a duty cycle of less than 50% to the LEDs of the LED assembly.

Figure 2:
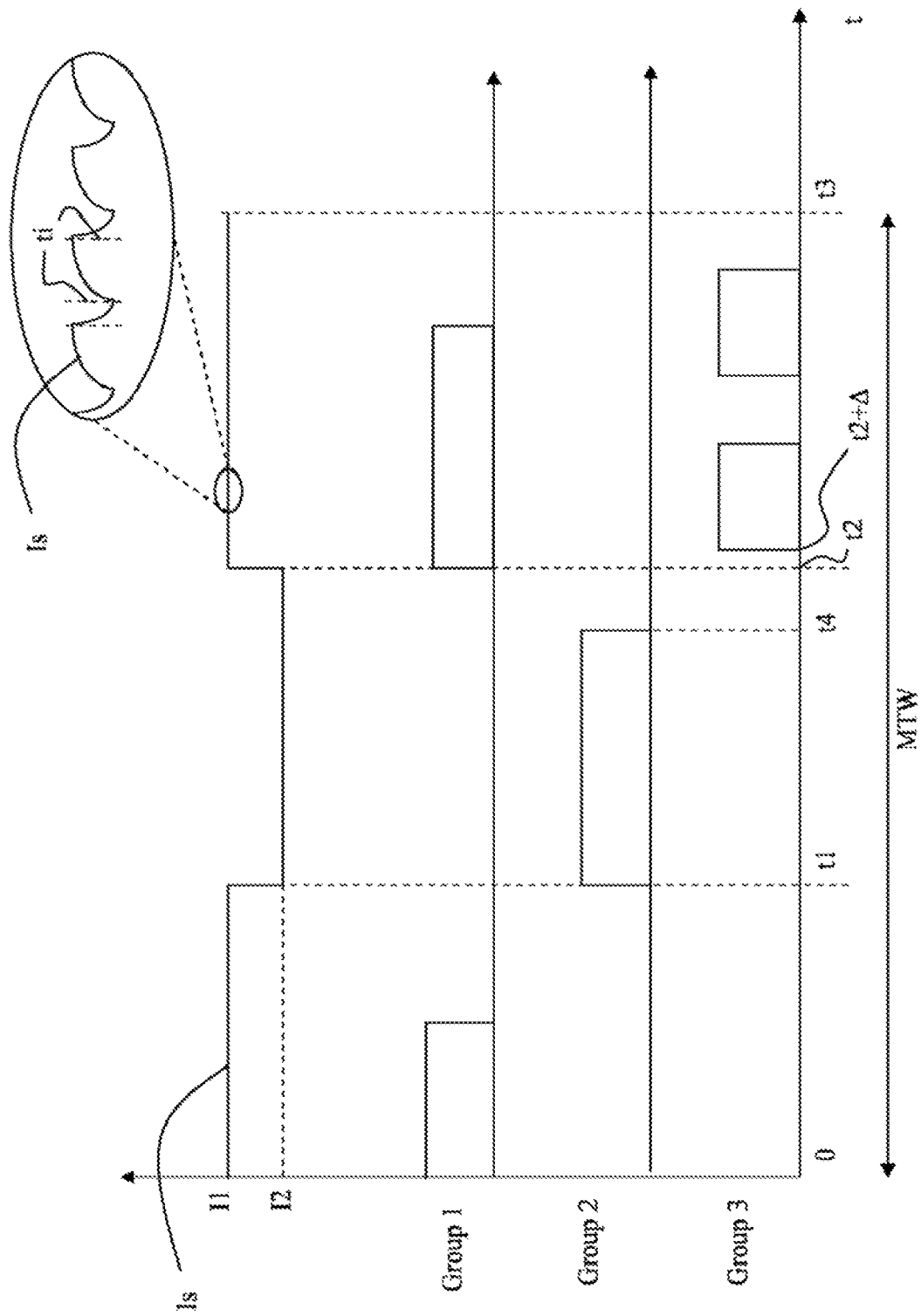
FIG. 2 depicts a current amplitude modulation scheme and duty cycle modulation schemes as can be applied in an embodiment of the present invention.

FIG. 2 schematically shows a possible current amplitude modulation scheme and corresponding duty cycle modulation schemes for the three groups of the branch 272 of FIG. 1, the schemes indicating amplitude modulations of the current Is as supplied and the required switching operations of the three groups of LEDs of the branch 272 during a modulation time window MTW. FIG. 2 schematically shows the switching operations of the parallel switches over the groups as indicated above. It is further assumed that the switch 280.5 is kept closed.

As can be seen in the upper graph of FIG. 2, (indicating the supply current Is as provided by the SMPC), the required current is at a value I1 during intervals 0 to t1 and t2 to t3, whereas the required current is at a value I2 during the interval t1 to t2.

The three other graphs indicated by reference to the groups 1, 2, and 3, indicate whether or not the respective switches of the groups (switches 280.1, 280.2 and 280.3) should be open or closed, whereby a non-zero may e.g. indicate that the switch should be open, a zero value of the graph indicating that the switch should be closed. During such periods, the current as supplied, either I1 or I2 will flow through one or more of the parallel switches 280.1, 280.2 and 280.3. As such, in accordance with the graph for group 2, one can see that switch 280.2 is only open during the interval t1 to t4, during which interval the SMPC provides in a current with amplitude I2.

By determining, based on a desired illumination characteristic that is to be generated by the LED assembly, a current modulation scheme and duty cycle modulation scheme as e.g. shown in FIG. 2, particular requirements or constraints of the different LEDs as applied or the different topologies as applied, may be taken into account more easily.

In the example given, it may e.g. be that the LED C of group 2 may only be supplied with a current of amplitude I2, rather than a current I1. As another example, one could e.g. consider that LEDs A and B would be connected in parallel rather than in series; in such a situation, the current during the interval 0 to t1 could even be allowed to be higher than I1 (assuming I1 being the nominal current of LEDs A, B and D), because, in the example shown, LEDs C and D are not on during this interval.

By distribution the processing or control power over the light engine and the LED driver, as e.g. done in an embodiment of the present invention, control of an LED assembly of a light engine is facilitated. In particular, by providing a control unit (such as control unit 260) 'on-board' of a light engine, the processing of a command representing a desired Illumination characteristic can be performed at least partly by the on-board control unit, said control unit having knowledge of the LED assembly it is connected to. In such an arrangement, the control unit of the light engine may determine the desired current modulation scheme and switching operations of available switches on the light engine, thereby taking into account any particulars, such as physical constraints or topologies of the LED assembly. By incorporation this information in the control unit of the light engine (e.g. in a memory unit of such a control unit), this information need not be shared or known to the LED driver that is used to power the light engine. In such an arrangement, the LED driver need not have any particular knowledge about any constraints imposed by the LED assembly as it is merely required, in an embodiment, to follow instructions as received by the control unit of the light engine. In particular, in such an embodiment, when the current amplitude modulation scheme is determined, e.g. by the control unit of the light engine or a separate master control unit, this control unit may provide the current amplitude modulation scheme to the control unit of the LED driver, e.g. in the form of a desired current set point, as a function of time. As such, the control unit of the LED driver may thus act as a slave in a master-slave configuration with the control unit of the light engine and modulate the current as outputted as indicated by the upper graph of FIG. 2, i.e. during the modulation time window.

As will be understood by the skilled person, the switching pattern and current modulation pattern as indicated by the current amplitude modulation scheme and the duty cycle schemes is subsequently repeated until a control unit of the system receives another illumination set point, which may then give rise to different current modulation and switching schemes.

In an embodiment of the present invention, amplitude modulations of the current amplitude modulation scheme and switching operations of the duty cycle modulation scheme are non-overlapping.

In this respect, it may be pointed out that, as will be understood by the skilled person, LED driver as applied in the present invention may e.g. be equipped to generate more than one output current Is. In particular, LED drivers as applied in the present invention may e.g. be equipped with multiple power converter, each configured to generate or output, at an output channel or terminal of the LED driver, a controllable current. In such embodiment, each SMPC may be controlled by a dedicated control unit, or a common control unit may be provided, controlling the operation of the multiple SMPCs. Such an embodiment of an LED driver may e.g. be advantageously combined with a light engine having multiple channels. In an embodiment, such multiple channels may be construed as multiple parallel branches, as e.g. done in FIG. 1. However, as an alternative, each branch of multiple parallel branches may have its own input terminal to receive a supply current such as the supply current Is as shown in FIG. 1. As an example, an LED driver may thus have two output terminals outputting currents with a different value, the output terminals being connected or connectable to two input terminals connected or connectable to two different branches of LEDs. It may further be pointed out that in such an arrangement, whereby multiple output or supply currents are available and connectable to multiple input terminals, one or more switches may be provided to selectively connect the available branches of LEDs to the input terminals. As such, the connection of the LED branches, when available, to the multiple input terminals may be varied in time as well. As such, an LED or LED branch may be connected to a first channel of the LED driver at a particular instant or period in time and to a second, different channel at another instant or period in time. By doing so, intensity or color modulations may be realized as well.

In the embodiment as illustrated in FIG. 2, one can see that on t=t1, the current Is is modulated, i.e. changed from a value I1 to a value I2. At the same time, switch 280.2, associated with group 2, is switched to an open state. As will be understood by the skilled person, the current as supplied or outputted by an SMPC will not change instantaneously from a value I1 to a different value I2. Rather, there will be a transient in the current profile before the current is at the new set point value. During this transient, there is an uncertainty about the actual value of the current, rendering it difficult to determine the required switching or duty cycling of the switches of the light engine, in order to avoid this uncertainty, in an embodiment, the current modulations and switching operations are separated in time. In FIG. 2, this is e.g. illustrated by the switching operation of group 3 (bottom graph of FIG. 2). As can be seen, switch 280.3 associated with group 3 is switched to an open state (thus allowing the supply current Is to flow through the LED D) at t=t2+Δ, rather than at t=t2, when the current is changed from a value I2 to a value I1. Using such a delay Δ, one can ensure that the transient behavior associated with a current modulation is over and that the current is at the actual expected value (e.g. I1), when the switch is operated. By means of the delay Δ, one can thus ensure that the switching actions of the switches associated with the LEDs or LED groups of the LED assembly are arranged to occur at instants in time that are different from the instants at which the supply current of the SMPC is adjusted.

In this respect, it can be pointed out that in case the LED driver, in particular the SMPC of the LED driver also performs a pulse modulation, i.e. the output current is not continuous but pulsed, similar delays may be adequately applied with respect to the pulsed current as outputted by the SMPC. With respect to the pulsed mode operation of the SMPC, it may be pointed out that and additional switch may be provided in the SMPC to turn off (in a pulsed mode) the SMPC.

In an embodiment of the present invention, the first and second control unit are configured to synchronize a switching operation of a switch of the switched mode power converter (SMPC) with a switching operation of one or more of the switches of the light engine. Due to the switching operation of the SMPC (e.g. by switching the switch 220.2 of the SMPC 220 as shown in FIG. 1), the output current Is of an SMPC will not be constant but will have a saw-tooth profile, as illustrated in the detail 400 of the current Is. In the detail 400, instants ti indicate switching instants of the switch 220.2, said switching causing the current slope to reverse. i.e. from an increasing current to a decreasing current and vice-versa).

By synchronizing the switching operations of the switches of the light engine, as e.g. indicated by the duty cycle schemes shown in FIG. 2, with the switching instants ti of the SMPC, a more accurate correspondence between the actual illumination characteristic and the desired characteristic can be achieved. In addition, parasitic disturbances such as flicker may be mitigated by synchronizing these instants. In order to realize such a synchronization, various options exist.

In an embodiment, the control units of the LED driver and of the light engine as applied in the modular system according to the present invention, may e.g. in an embodiment, be provided with a common clock signal to synchronize operations.

Figure 3:
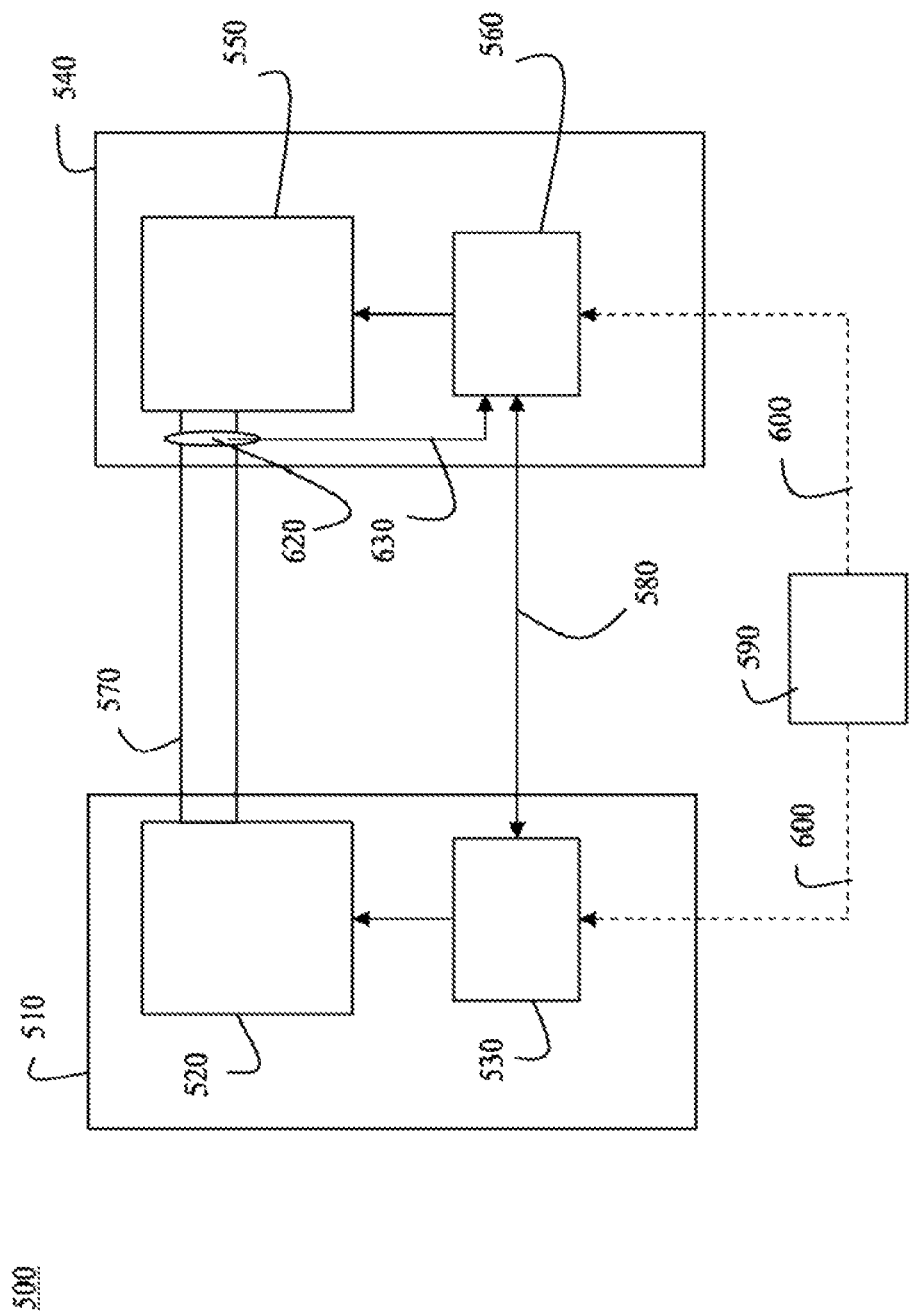
FIG. 3 depicts a modular system according to a second embodiment of the present invention.

FIG. 3 schematically shows a general set up of a modular system 500 according to the present invention wherein various options for synchronization are illustrated. The modular system 500 as shown comprises an LED driver 510 comprising a switched mode power converter (SMPC) 520 and a control unit 530 (e.g. a microprocessor or microcontroller or the like). The system 500 further comprises a light engine 540 comprising an LED assembly 550 (comprising a plurality of LED, e.g. arranged in groups and one or more switches for controlling the currents through the LEDs or groups of LEDs of the LED assembly) and a control unit 560 for controlling the switches of the LED assembly 550. In embodiment as shown, lines 570 represent the power supply as provided by the SMPC to the light engine. Line 580 indicates a communication channel between the control unit 530 of the LED driver and the control unit 560 of the light engine.

In the embodiment as shown, the system further comprises a master control unit 590 which may e.g. be configured to provide a synchronization signal 600 (e.g. a clock signal) to both the control units 530 and 560 to synchronize the switching. In such embodiment, the control units of the LED driver and the light engine may thus make use of a common clock signal that is provided by the master control unit 590. Alternatively, either the control unit of the LED driver or the control unit of the light engine may provide a synchronization signal to the other control unit, in order to synchronize operations. This can e.g. be realized via the communication channel 580. Communication channel 580 can be any suitable communication channel, either wired or wireless for exchanging data or commands between the control units 530 and 560. The communication channel may be bi-directional or uni-directional, depending on the manner in which both control units co-operate. The communication channel may be of a hybrid form in conveying both analog waveforms to f.e. signal events or to convey values or may exhibit digitally interpretable waveforms to convey commands, status and data in digital form or any suitable combination of those. The communication channel can be synchronous, asynchronous, non-deterministic, deterministic, real-time or non-real time.

As an alternative to synchronizing via a common synchronization signal or clock signal, the light engine may e.g. be configured to detect the switching instants ti of the switch of the SMPC. In FIG. 3, 620 represents a measurement unit configured to measure the current as supplied by the SMPC and provide a signal 630 representative of the current to the control unit 560 of the light engine. Based on such a signal, the control unit 560 may e.g. be configured to derive the switching instants (instants ti as e.g. indicated in FIG. 2) of the SMPC and synchronize the switching of the switches of the light engine to these instants.

Alternatively or in addition, as will be explained in more detail below, purposive pulses may be applied to enable a synchronisation of the control units. As an example, the LED driver may be configured to apply a current pulse at the start of every modulation time window.

In case the modulation time window is subdivided into multiple sub-windows, also referred to as slots or time slots, a current pulse may also be applied at the start of each sub-window.

In an embodiment, different types of pulses may be applied to indicate the start of the modulation time window or the start of a sub-window. Pulses may e.g. be differentiated based on their height, on their position or on their position relative to another pulse.

The current pulses as applied may also, in an embodiment, represent particular symbols to indicate the start of a modulation time window or sub-window. Such a representation of a symbol may be a predetermined sequence of different current levels. As an example, of sequence of high-low-high-low pulses may e.g. be interpreted as 1010 as a binary symbol, whereas high-medium-low-high-low-medium may e.g. be interpreted as a multilevel symbol 210201.

In an embodiment of the present invention, the application of the one or more current pulses that are used for synchronisation purposes are such that they do not affect the average current or intensity as provided by the LEDs or LED groups. Phrased differently, the contribution of a current pulse, either a positive or negative pulse can be accounted for in the current modulation scheme by compensating the positive or negative pulse in the remainder of the modulation period, e.g. a sub-window, that is used to generate a required current for a particular LED or LED group.

In an embodiment as described above, the control unit of the light engine was configured to determine, based on a receive set point representing a desired illumination characteristic, a current amplitude modulation scheme and a duty cycle modulation scheme.

In such an arrangement, the control unit of the light engine can be considered the master whereas the control unit of the LED driver acts as slave, following commands of the control unit of the light engine, e.g. received via a communication channel such as communication channel 580 as shown in FIG. 3.

In an alternative embodiment, the control unit of the LED driver, e.g. control unit 230 or control unit 530 acts as master control unit. In such embodiment, the control unit of the LED driver may e.g. be configured to:
  receive, at an input terminal of the control unit, LED assembly information describing the LED assembly to be powered and
  receive, at the input terminal, a set point representing a desired illumination characteristic to be generated, during use, by the LED assembly.

As will be clear to the skilled person, in a modular system whereby the LED driver and light engine are combined, the LED driver may require information about the light engine that needs to be powered. In accordance with the embodiment of the present invention, the control unit of the LED driver may therefore be configured to receive such information. In particular, such LED assembly information may e.g. describe the topology or layout of the LED assembly of the light engine that needs to be powered, e.g. including technical data such as voltage or current requirements of the different LED of the LED assembly, descriptive data indicating how the LEDs are connected and optionally grouped, descriptive data about the available switches and the manner in which they control the current through certain LEDs or LED groups of the LED assembly (e.g. switches connected in series or in parallel).

In accordance with the embodiment of the present invention, the control unit of the LED driver may then be configured to determine, based on the received set point and the LED assembly information, a current amplitude modulation scheme and a duty cycle modulation scheme, in a similar manner as described above.

In such an arrangement, whereby the LED driver, in particular the control unit of the LED driver, acts as master, may provide a control signal to the control unit of the light engine, the control signal representing the required duty cycle modulation scheme to be executed by the light engine. In such an embodiment, the LED driver may further communicate certain events to the light engine, e.g. for the purpose of synchronization. As an example, the LED driver may e.g. communicate the occurrence of switching instants of the SMPC of the LED driver to the light engine or the start of a modulation time window as described in FIG. 2.

As an alternative to the use of the communication channel 580 as shown in FIG. 3, any required communication between the LED driver and the light engine may also be realized by means of power line communication or the like, whereby the power lines, e.g. power lines 570, are used for communicating data or commands between the LED driver and the light engine. Such power line communication may e.g. include the use of positive or negative voltage or current pulses or spikes on the power lines By using a master-slave setup for the control units of the LED driver and the light engine, as e.g. discussed above, the communication between the LED driver and the light engine may be kept to a minimum, since only a current set points may need to be communicated, in an embodiment of the present invention.

In an embodiment, the modulation time window is considered to comprise sub-windows, one sub-window per group of LEDs that is controllable by a particular switch, whereby the switching of the particular switch only occurs in one of the sub-windows. In an embodiment, the sub-windows are non-overlapping. In this respect, reference may e.g. be made to US 2012/0235589, incorporated herein by reference in its entirety.

In an embodiment, an LED driver may e.g. be configured to supply a current to multiple LEDs or LED groups of a light engine during a modulation time window comprising a respective multiple sub-windows, whereby, during each sub-window, only one LED or LED group is supplied with the current.

Figure 4:
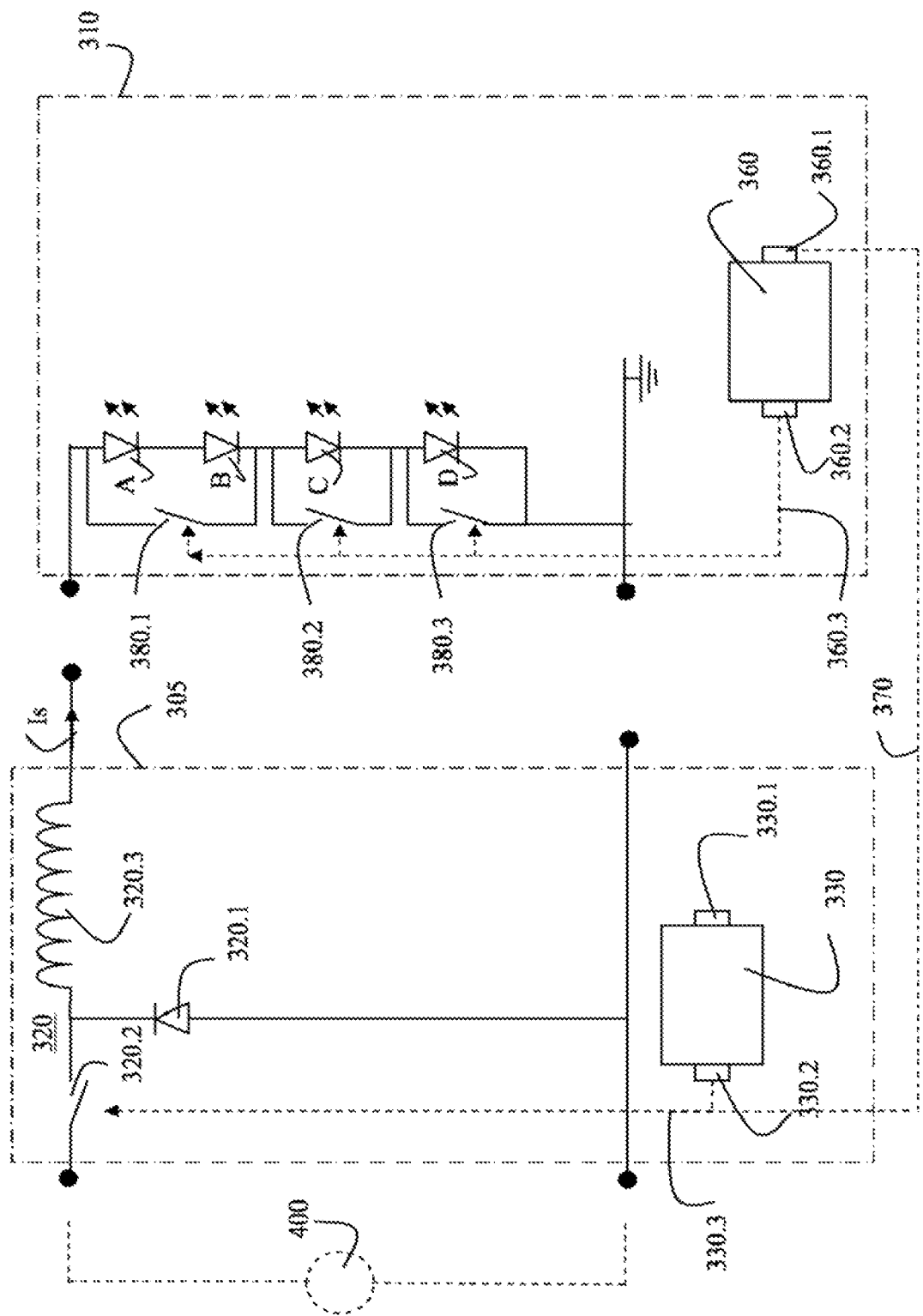
FIG. 4 schematically depicts a modular system according to a third embodiment of the present invention.

A modular system according to the present invention, enabling such operation is schematically shown in FIG. 4. In the embodiment as shown, the LED driver 305 comprises a switched mode power converter (SMPC) 320 and a first control unit 330 for controlling the switched mode power converter (SMPC).

In accordance with the present invention, various switched mode power converters may be applied such as Buck, Boost, Buck-Boost or hysteretic converters. In the embodiment as shown, the SMPC is a Buck converter 320 including a diode 320.1 a power switch 320.2 and an energy storage element 320.3, i.e. an inductance. Typically, such converters comprise a switch such as switch 320.2 as shown, for controlling an output current Is as supplied by the SMPC. In an embodiment, the SMPC 320 may e.g. be powered via a rectified DC supply voltage 400. In an embodiment, the switch may be controlled by the first control unit 330, e.g. based on a current measurement performed by the light engine, e.g. by detecting a voltage across a resistor in series with the LED assembly (not shown).

In the embodiment as shown, the light engine 310 is a separate component comprising an LED assembly comprising multiple LEDs or LED groups, a plurality of switches for controlling whether or not a current flows through the LEDs and a control unit 260 for controlling the switches. In the embodiment as shown, the LEDs of the LED assembly are arranged in one branch comprising three groups (group 1 comprising LEDs A and B, group 2 comprising LED C and group 3 comprising LED D) that are arranged in series, each group further having an associated switch 380.1, 380.2, 380.3 for controlling the current through the LED group. In accordance with an aspect of the present invention, the controlling of the SMPC, i.e. the power converter 320 of the LED driver 305 and of the switches 380.1-380.3 as applied in the light engine 310 may e.g. be performed by separate control units.

Within the meaning of the present invention, a control unit or controller may e.g. be embodied as a microprocessor or processor or any other type of control circuitry. In general, such a control unit may comprise an input terminal 330.1, 360.1 for receiving command signals such as a user defined illumination set point, i.e. an input signal (e.g. provided via a user interface) representing a desired illumination characteristic of the LED assembly. In an embodiment, such a desired illumination characteristic may e.g. include a desired intensity and a desired color of the light as generated by the LED assembly of the light engine or a certain ratio between the intensities or colors of multiple channels or branches, or a dynamic sequence of such ratios, e.g. resulting in a light show. A control unit or controller may further comprise a processing unit for processing the commands or input signals and e.g. a memory unit for storage of data. A control unit or controller further typically has one or more output terminals 330.2, 360.2 for outputting control signals, e.g. for controlling an electronic switch of the SMPC (indicated by the dotted line 330.3) or controlling a switch of the light engine (indicated by the dotted line 360.3). In the embodiment as shown, a communication channel is further provided connecting the first and second control unit 330, 360. Such a communication channel may e.g. be a bidirectional or unidirectional serial communication channel.

In a system as schematically shown in FIG. 4, a desired illumination characteristic to be emitted by the LEDs of the LED assembly can be realized as follows during a modulation time window, under the assumption that only one of the LEDs or LED groups is on at the same time.

Assuming that a set point representing a desired intensity and color is received, e.g. via the input terminal 330.1 of the first control unit 330. Based upon the desired color characteristic and the known characteristics of the LED groups, the first control unit may then determine the appropriate required mixing of the LED group colors in order to arrive at the desired color indicated by the set point. As an example, the desired color may e.g. be realized by having the first group (LEDs A and B) on for 25% of the time, having the second group (LED C) on for 50% of the time and having the third group (LED D) on for 25% of the time. Note that these percentages are determined under the assumption of the same current being provided to the LED groups. Within the meaning of the present invention, these percentages may also be referred to as ratios of the LED groups, indicative of the ON-time of an LED group over the modulation time window.

Once such an assessment is made, a modulation time window may, in an embodiment, be subdivided into different sub-windows having durations or periods proportional to the determined percentages. Such a time-division of the modulation time window may be referred to as a time-division scheme, such a scheme representing the desired or required switching actions required to apply the supply current to the appropriate LED group, during the appropriate period.

In an embodiment of the present invention, the desired illumination characteristic is realized by appropriate switching and control of the current during a time interval or time window referred to as the modulation time window. In an embodiment, the modulation time window is an interval, a particular period during which all required switching actions and amplitude modulations of the current of the SMPC can be grouped, in order to realize the desired illumination characteristic. Phrased differently, the average intensity of the LEDs of the LED assembly during the modulation time window is such that it corresponds to the desired intensity; the same holds for the desired color as indicated by the desired illumination characteristic. By selecting the modulation time window sufficiently small, an observer will not notice the actual modulation of the current or the switching of different LEDs or LED groups during the modulation time window.

Figure 5:
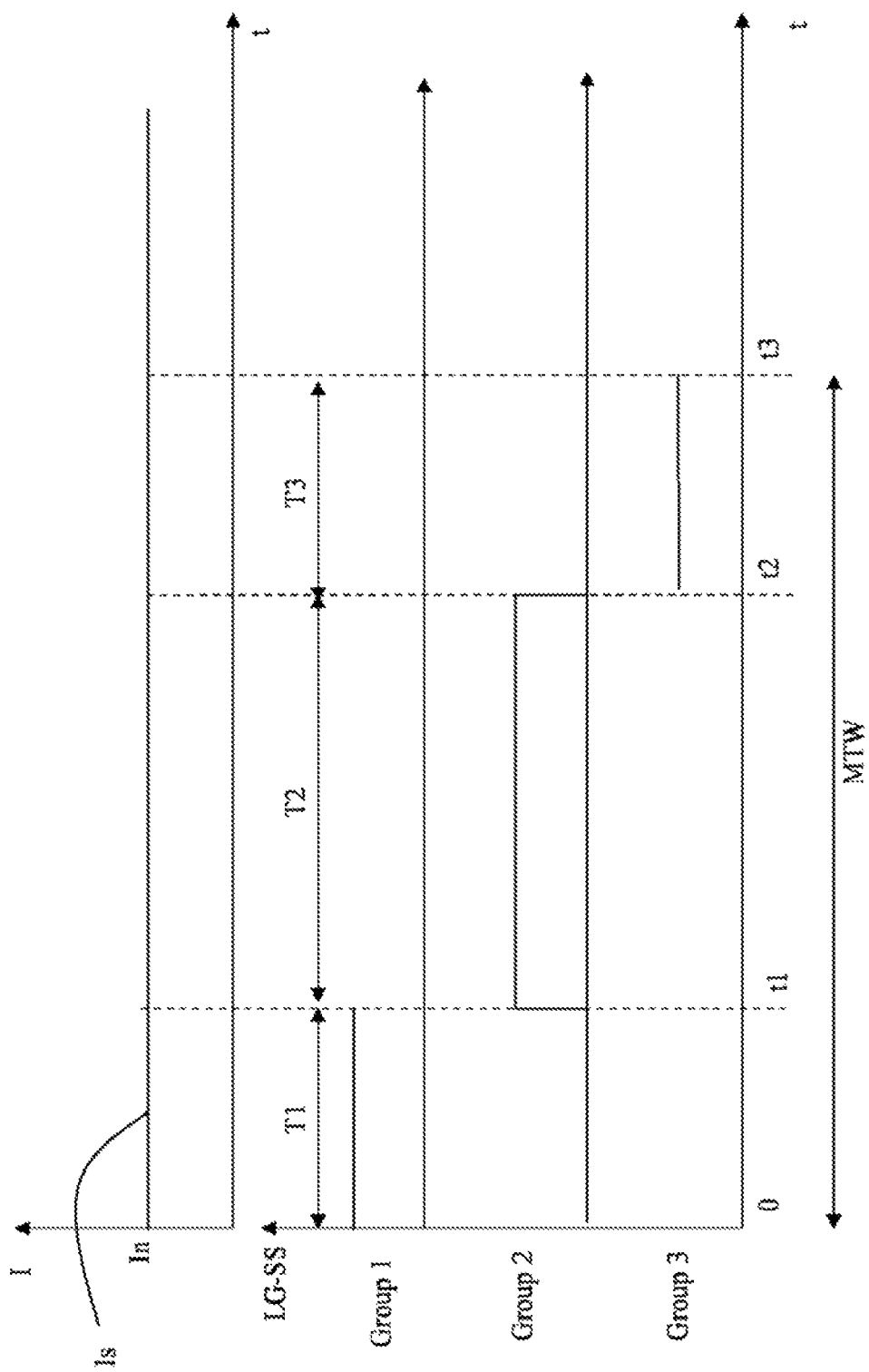
FIG. 5 depicts a time division scheme as can be applied in an embodiment of the present invention.

FIG. 5 schematically shows the required switching operations of the switches 380.1, 380.2 and 380.3, LG-SS (LED group switching sequence), in order to realise the ratios as indicated for the LED groups, i.e. to subdivide the modulation time window in accordance with a time-division scheme that results in a desired color. In particular, in order to turn on Group 1 of the LEDs during $\frac{1}{4}^{th}$ of the period MTW (the modulation time window), switch 380.1 needs to be open during the period T1 from t=0 to t=t1; in order to turn on Group 2 of the LEDs during $\frac{1}{2}^{th}$ of the period MTW, switch 380.2 needs to be open during the period T2 from t=t1 to t=t2, and, in order to turn on Group 3 of the LEDs during $\frac{1}{4}^{th}$ of the period MTW, switch 380.3 needs to be open during the period T3 from t=t2 to t=t3. In an embodiment, the control unit 360 of the light engine may e.g. be configured to determine the desired time-division scheme needed to realise the desired color set point. In such embodiment, the first control unit 330 may e.g. communicate the desired color set point to the second control unit 360. Alternatively, the first control unit 330 may determine the desired time-division scheme and communicate it, e.g. via a serial communication channel. e.g. channel 370, to the second control unit 360.

With respect to the desired intensity, e.g. indicated by a set point as received, such a desired intensity can be realised by supplying the appropriate current to the LED assembly of the light engine. In the example as shown in FIG. 5, a current I=In, e.g. the nominal current of the LED driver, is provided to the light engine during the modulation time period.

In this respect, it can be pointed out that, due to the application of the time-division scheme which represents the required sub division of a modulation time window to arrive at a desired color, the current can be maintained at the same level during the entire modulation time window. One could represent such a situation by a current modulation scheme that merely represents a single value, In.

In another embodiment however, the current as supplied during each sub-window may be changed as well. As an example, the applied supply current may be different in each sub-window. In addition, current modulations, e.g. duty cycling may be applied within one or more sub-windows. As such, each sub-window may further be subdivided into different sub-sub-windows, during which a particular current modulation may be applied.

In case the intensity of the generated light is to be reduced, while maintaining the color set point, the current as generated by the LED driver, e.g. LED driver 305, can be reduced. Alternatively, or in addition, the current as supplied by the LED driver could be modulated.

By performing the duty cycle modulation by the switch of the LED driver, the complexity of the time-division scheme can be kept low.

Assuming that the intensity of the illumination needs to be reduced to 50% and assuming a linear relationship between the intensity and the supply current I, such a dimming set point can be realised by either reducing the current to 50% of the nominal current. In or by applying a duty cycle of 50% during each of the periods T1, T2, T3.

Figure 6:
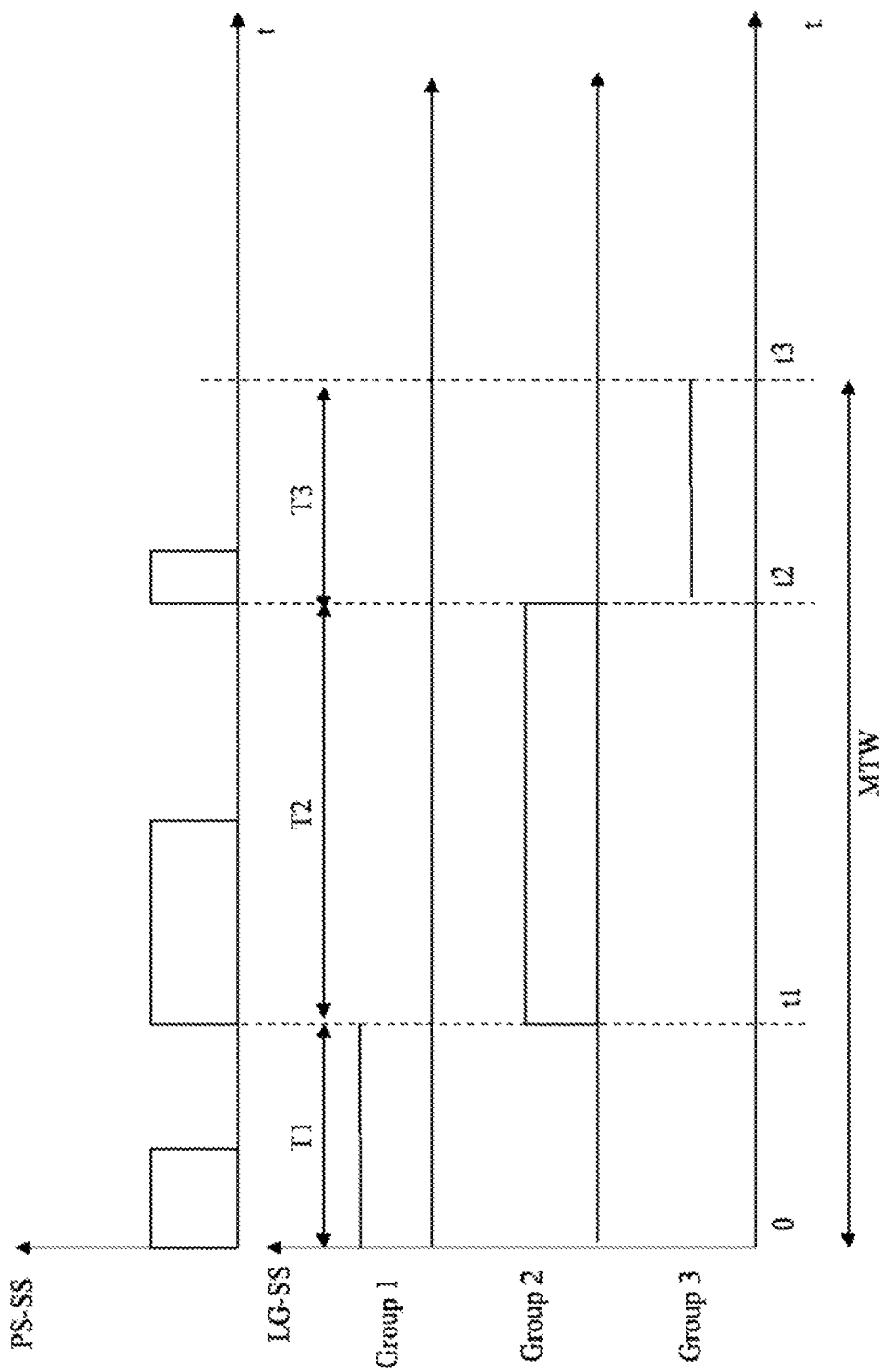
FIG. 6 depicts a duty-cycle modulation scheme and corresponding time division scheme as can be applied in an embodiment of the present invention.

In the latter case, in accordance with an embodiment of the present invention, the duty cycling may be realised by appropriate switching of the power switch 320.2 of the LED driver 305. In this respect, it can be pointed out that, when a very low intensity is required, e.g. lower that an intensity corresponding to a lowest current value that can be realised by the LED driver, the application of duty cycling of the power switch of the LED driver may enable to realise this. FIG. 6 schematically shows a possible switching sequence, or duty cycle modulation scheme, of the power switch 320.2, PS-SS, illustrating that a supply current is provided by the LED driver during a first half of the period T1, during a first half of the second period T2 and during a first quarter of the third period T3. Assuming that the supply current in the depicted situation corresponds to the lowest available current of the LED driver, the duty cycling of the power switch enables to obtain even lower illumination set points.

Note that, in the embodiment as shown, the switches of the light engine, i.e. switches 380.1-380.3 are merely applied to ensure that the current supplied by the LED driver is applied to the appropriate LED group, whereas the control of the current, both with respect to amplitude and duty cycle, is performed by the LED driver.

Note that, in addition to performing a duty cycling using the power switch 320.2, and additional duty cycling using the switches 380.1-380.3 could be considered as well, in a similar manner as illustrated in FIG. 2.

It can further be noted that, in addition to the duty cycling of the power switch 320.2 as e.g. shown in the switching scheme PS-SS of FIG. 6, a current modulation of the supply current of the LED driver may be applied as well; in particular, the current I as supplied need not be kept at the same value during the periods T1, T2, T3, the current may e.g. be kept at a first value I1 during a first half of the periods and at a second value I2 during the second half of the periods, thus enabling to obtained a higher resolution with respect to intensity.

In the embodiment as shown in FIGS. 5,6, the modulation time window is subdivided into sub-windows, whereby the duration of the sub-windows is selected to represent a desired color set point. Alternatively, the sub-windows may have a fixed period, e.g. 1/N×MTW, whereby N equals the number of LED groups. Note that, in such an embodiment, the current as supplied during the different sub-windows may need to be modulated, i.e. have different values, in order to arrive at a desired color. This modulation may e.g. include applying different current values during the different sub-windows or applying a different duty cycle during the different sub-windows, or applying a modulated current waveform during the different sub-windows or sub-sub-windows.

As such, in the embodiment as described in FIGS. 4-6, a desired illumination set point may be obtained by determining a time division scheme, indicating a desired switching of the light engine, a duty cycle modulation scheme and/or current modulation scheme, indicating a desired operation of the LED driver to generate the required supply current.

In a similar manner as described w.r.t. FIGS. 1-3, the processing or control power to arrive at the set point may be distributed over the light engine and the LED driver. In particular, in the example given, the control to arrive at the desired time-division scheme may be realised by the control unit 360 of the light engine, whereas the control to arrive at the desired supply current, e.g. represented by the current modulation scheme and/or duty cycle modulation scheme, e.g. modulation scheme PS-SS, may be realised by the control unit 320 of the LED driver. Alternative arrangements whereby the duty-cycle modulation is performed by the light engine or where the light engine may affect the intensity emitted may be considered as well.

A consequence of the distribution of the control power over the control units of the LED driver and the light engine, is that an accurate synchronisation between the control actions of the control units is desired. Note that a synchronisation may be less critical in case one of the first or second control unit acts as a master controlling the other control unit. In such arrangement, the master control unit may e.g. transmit a set point to the slave control unit.

The present invention proposes various ways to arrive at such a synchronisation.

The main objective of the synchronisation of the control actions of the control units applied is to ensure that the illumination as generated by the LED assembly of the light engine substantially matches a desired illumination characteristic. e.g. represented by a set point, e.g. received by either the control unit of the LED driver (230, 330) or the control unit of the light engine (260, 360). In this respect it can be noted that the control actions by the control unit may refer to control signals for controlling the switches in the LED driver, e.g. the switch 220.2 or 320.2 of the SMPC of the LED driver, and/or to control signals for controlling the switches of the light engine, e.g. switches 280.1-280.6 or 380.1-380.3. These control actions result in a modulation of the supply current as provided by the LED driver and a modulation of the current as supplied to the multiple LEDs or LED groups of the LED assembly of the light engine.

Since these actions may be initiated by different control units, a synchronisation is required.

More specifically, the overall modulation as applied to the LEDs or LED groups is characterised by a sequence of modulation cycles, e.g. represented above as modulation time windows (MTW), where during each modulation time window, the currents through the LEDs or LED groups is modulated in such manner that, on average, a desired intensity and/or desired color is obtained. During such a modulation time window MTW, the instantaneous current through a particular LED or LED group may vary substantially, in accordance with the applied current modulation scheme, duty cycle modulation scheme or time-division scheme. In addition to the overall, averaged, boundary conditions for the currents as supplied to the LEDs or LED groups, there may be some additional requirements for the instantaneous current, e.g. with respect to the occurrence of flicker or with respect to efficiency of the light engine, the LED driver or the modular system as a whole.

In an embodiment, the modulation time window as applied may further be defined by it being subdivided in periods, referred to as sub-windows, where, during each period, a specific purpose or objective is targeted. A possible purpose is that during such a sub-window, as e.g. illustrated in FIGS. 5 and 6, a particular LED or LED group is controlled (the LED or LED group e.g. radiating red light) while during the next sub-window another LED or LED group is controlled (that e.g. radiates blue light), and so on. A further purpose of the sub-windows may be to distribute the control of a specific LED group in time such that the frequency content of the applied current modulation for that specific LED group only holds frequencies that are sufficiently high, such that they are not observed in the overall generated illumination by a human or camera.

It may further be noted that the synchronization of the control units of the LED driver and the light engine should not only synchronize the start and stop times of a modulation time window and its periods or sub-windows, which is further on referred to as 'frequency synchronisation', there should also be a correct 'phase relationship' between the applied control actions and schemes in order to ensure that, when a particular objective of the modular system is to be realised during a sub-window, e.g. LED group x is to be supplied with a particular current and duty cycle, the control actions controlling the supply current and the control actions controlling the sub-window are in phase. This synchronisation is further on referred to as 'phase synchronisation'. Without such a synchronisation, a first control unit may e.g. target a purpose that is not in line with actions taken by the second control unit, despite being synchronised with respect to frequency.

To illustrate this, reference can e.g. be made to the duty cycle modulation scheme PS-SS and the time-division scheme FIG. 6. As can be seen, during T3 of the MTW, a current with a duty cycle of 25% is supplied to group 3. It can be pointed out however that the duty cycle of the current is implemented by the LED driver, whereas the enabling of the current through a particular LED or LED group is implemented by the light engine. So, in order to apply the appropriate current to the appropriate LED or LED group, the duty cycle modulation scheme needs to be in phase with the time-division scheme of the groups. If not, e.g. assuming that there is phase difference equal to period T3, the duty cycle modulation scheme intended for group 1 would e.g. be applied to group 3.

Frequency Synchronisation

In accordance with the present invention, a frequency synchronisation may be realised in the following manners:

A first method to realise a frequency synchronisation is to synchronise a modulation clock signal of a first control unit with a modulation clock signal of the second control unit. Within the meaning of the present invention, a modulation clock signal of a control unit refers to a repetitive signal that is used for the synchronisation of actions that are controlled by the control unit, e.g. switching operations or current level adjustments, whereby the modulation clock signal is derived from an internal clock signal of the control unit.

Method 1 may thus be described as a method that enables to synchronise the clock mechanism of both control units on which the modulation relies. The clock mechanism may be considered the mechanism that delivers the modulation clock signal, e.g. an interrupt mechanism delivering a repetitive interrupt signal based on the internal dock signal of the control unit.

As second manner of frequency synchronisation would be to synchronize the start times of the modulation time windows or sub-windows. As the modulation time windows are arranged head to tail, the stop times are thus known as well. Should there be an intermediate time between cycles or periods, then the stop times may need a separate synchronisation which can be implemented using the same method as used for the start times. Note that in general, the modulation cycles or modulation time windows, periods or sub-windows as applied in the present invention may have variable length.

More details on both methods are provided here below:

Method 1:

In an embodiment, the first control unit and the second control unit may be connected by means of a serial communication bus. In an embodiment, each control unit may have a bidirectional or unidirectional communication port for serial communication. As an example, a bidirectional communication port of the first control unit may be connected to a bidirectional communication port of the second control unit in such a way that bidirectional communication is possible (e.g. Tx1-Rx2 and Rx1-Tx2). In general, a serial communication is characterized in that data elements are transmitted consisting of a number of bits. Each bit represents a state on the communication line which is associated with the bit being a logical 1 or a logical 0. The state on the communication line can be a voltage, a differential voltage, a current, a differential current, an impedance, an optical intensity, a color, and so on.

The serial communication may further be characterised in that each bit of the data elements are present on the communication line for a fixed duration referred to as the bit-time or bit-duration.

The first control unit may e.g. be a microprocessor or the like, as known in the art and operating based on a clock signal, as also known in the art. The clock signal may be generated external or internal to the first control unit and can be characterized by its nominal frequency, actual frequency, jitter, temperature dependency, and so on. As such, a timing based on such a clock signal will vary from processor specimen to processor specimen, e.g. depending on the temperature.

In order to synchronise the first and second control unit according to the first method, the first control unit may generate, in a first step, a bit stream for the serial communication based on its clock signal whereby a duration or period of one bit, i.e. the bit-time or bit-duration, is a large multiple of one period of the clock signal. In practice this multiple may be in the range of 200 for an example 8 MHz processor and 19200 bit rate. In accordance with this method, the actual bit-time or bit-duration will vary with the actual clock period and the bit-time may exhibit variations over time due to variations over time of the clock period and due to effects in the electronics used in the generation, such as jitter caused by for example noise on the clock signal or signal or edge steepness deterioration due to impedance networks as posed by communication channels or channel segments.

Upon transmission of the bit stream, the second control unit will receive the bit stream of the serial communication, e.g. via its bidirectional communication port.

In an embodiment of the first frequency synchronisation method, the second control unit is configured to measure, in a second step of the method, the duration or period of 8 data bits by measuring the time from the first rising edge of a sent byte 0x55 to the fifth rising edge of the start bit following byte 0x55. The resulting duration may then be used, in a third step of the method, to set a counter or timer such that the instances at which the incoming data bits are sampled are in the middle of the data bits received after a synchronization to the signal, e.g. using mechanisms such as pre-ambles, start- and stop bits and the like and using a first half bit duration offset. This synchronisation mechanism as applied resembles a method typically referred to as autobaud. However, in known, practical implementations of autobaud which are available on the market, the result of the autobaud measurement of the bit-time or bit-duration is not stored with a sufficient resolution to support a sufficiently accurate synchronisation.

In order to obtain a sufficiently high accuracy, in an embodiment of the first frequency synchronisation method, referred to as the 3-measurement-method, the second control unit measures the length of a data element as transferred over the serial communication line. A possible implementation is to start the transmission with a start bit, then send the N bits or of the data element and to end with 1 or 2 stop bits. Typically the transferred data element is a byte (N=8). Note however, that the data element may also consist of a number of symbols (each consisting of one or more bits), whereby the transmission starts with a start symbol and ends with an end symbol. By measuring the time between the rising edge of the start bit of the first byte and the start bit of the second byte, the bit-time or bit-duration can be calculated using the total number of start, data and stop bits, and the counter or timer can be loaded with the correct sample value as explained above. A condition is that the transmission of the second byte immediately follows that of the first byte.

Figure 7:
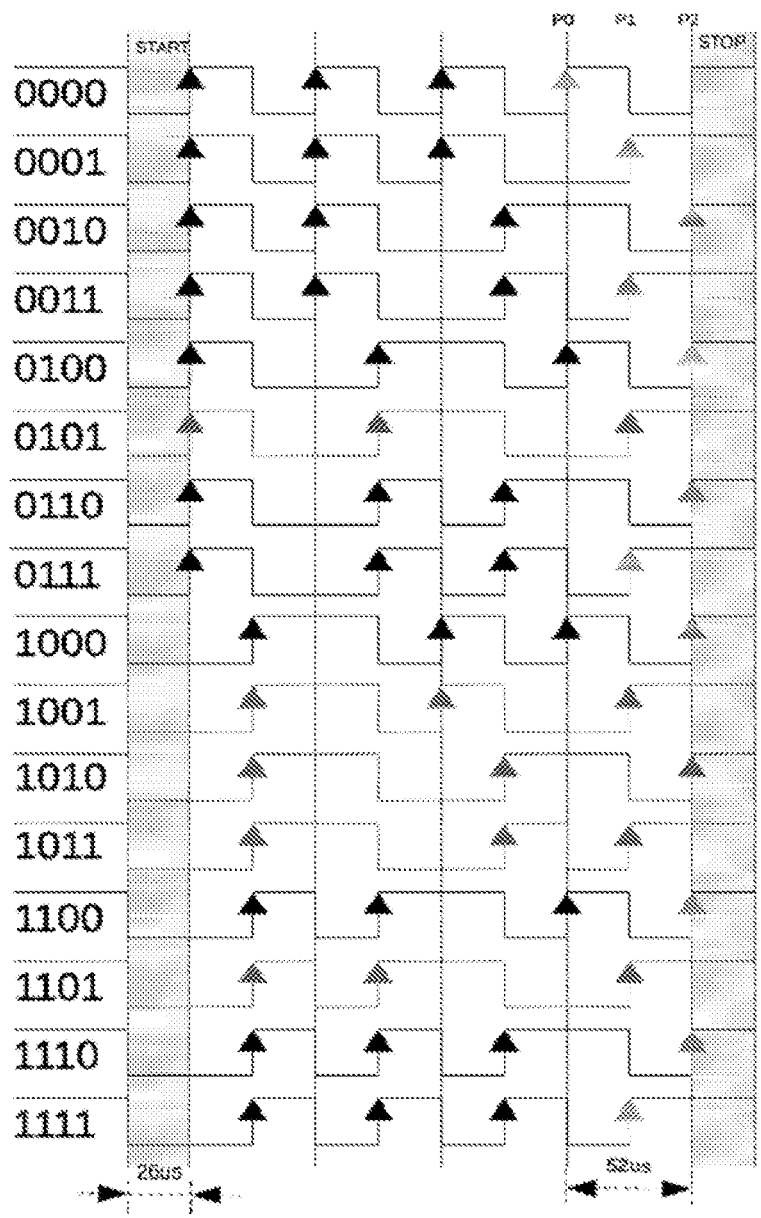
FIG. 7 depicts a Manchester coding of 4 bit symbols.

In an embodiment the serial communication may use Manchester encoding. In this embodiment, the second control unit measures the length of four rising edges in each regular data byte. Using Manchester encoding, each data element will either have 3 or four rising edges. The data elements having 4 rising edges may have their fourth rising edge at 3 distinct instances P0, P1 and P2 within the data element duration as is illustrated in FIG. 7.

As the clocks of the first and second control unit are synchronised, the measurements will form a distribution around the P0, P1 and P2 instances with a neglible overlap. This allows the resulting measurement to be classified as a P0, P1 or P2-measurement and by also taking the position of the first rising edge into account (derivable from the received data element value) the measurement can be converted to a value of a bit-duration or a data element-duration. As can be seen in FIG. 7, data elements having 3 rising edges will not have a fourth rising edge measurement within the P0, P1 and P2 distributions and may be classified as invalid for time measurement after the P2 distribution's largest time has passed. No timing result will be produced for such a data element.

As data elements with 4 rising edges will occur regularly in a data stream, measurement results are obtained quite often resulting in a plurality of instants to control and/or adjust the clock mechanism to become faster or slower, in order to keep in synchronisation with the first control unit. Note that it may not be required to actually adjust the clock mechanism of the second control unit; based on the determined bit-time or bit-duration. Based on the measured bit-time, one may determine a ratio of the clock periods of both control units and use this ratio to scale the timing of actions of the second control unit.

Note that, as will be understood, that the based on the measurement results, one may equally adjust the modulation control signal of the first control unit to the clock signal of the second control unit.

In accordance with an embodiment of the frequency modulation method, the measurement results as discussed above may be used to adjust the frequency of the signal delivered by the dock mechanism:

In an embodiment the clock mechanism delivers the instruction clock signal of the processor.

Slowing down that clock signal or speeding up that clock signal slows down respectively speeds up all operations of the processor and thus also the modulation clock signal.

Slowing down or speeding up the instruction clock signal depends on the processor and the clock generation circuitry chosen in the design of the control units. In case of a simple external crystal or ceramic resonator, some tuning can be done by changing the parallel capacitor(s) that is(are) typically connected to the crystal/resonator. Dedicated electronics possibly controlled by software can be used to deliver a tuneable clock. Another method is using a processor internal tuning method.

In an embodiment, the clock mechanism delivers a repetitive interrupt signal which determines the timing of the modulation.

Typically a repetitive interrupt is generated by configuring the processor used to implement the control units to have a timer (works like a counter) that counts down (the dual case: counting up can be equally well used) from a pre-loaded value and triggers an interrupt when it rolls over from the 0 value to the pre-loaded value. The configuration during the initialization of the processor than comprises the steps of configuring the counter to re-load from a register at the next active clock edge when at counter value 0, enabling the counter to interrupt the processor, setting the start value for the counter in the register and also pre-loading this value in the counter, and to start the counter.

To slow down the interrupt rate during normal operation, the value in the register can be set to a higher level, to speed up the interrupt rate, the value in the register can be set to a lower level, thus slowing down or speeding up the modulation clock signal.

In an embodiment, the measured bit-time or bit-duration is multiplied with a factor and directly loaded in the interrupt timer, via the register.

Method 2:

In an embodiment of the frequency synchronisation method as applied in the present invention, the start of the modulation time window or of a period or sub-window is made detectable by having the LED driver generate a distinct current pulse in the current waveform, the distinct current pulse coinciding in time with the start of the modulation time window, period or sub-window The detection by the interface board (or LED engine) of the distinct current pulse can either be done directly from a current measurement or from the forward voltage resulting from the current flowing through an LED-group.

In an embodiment of the present invention, the modulation clock signal or the interrupt signal may be used to synchronise switching operations, e.g. of the LED driver or may be used to initiate the generation of a distinct current pulse.

As an example, assume a modulation time window MTW of 3.3. msec, that is subdivided in to 8 sub-windows of 416 μsec.

Note that, within the meaning of the present invention, the sub-windows may also be referred to as slots or time slots since, in an embodiment, each sub-window or time slot may have a dedicated purpose, i.e. it may be used to apply a desired current modulation to a particular LED or LED group of the light engine.

Further, in the example given, a modulation clock signal or interrupt signal may be generated every 26 μsec, enabling to initiate control actions every 26 μsec when desired. Note that alternative selections of the duration of the modulation time window, the sub-windows or the clock signal timing may be considered as well.

In such example, a distinct current pulse, either an increase in current or a drop in current may be generated at the start of each modulation time window MTW, e.g. every 3.3 msec. Such a current pulse may e.g. be detected by means of a current measurement, performed by the light engine or by a voltage detection across the LED or LED group that is being powered; more specifically, the application of a current pulse to an LED or LED group will result in an associated pulse of the forward voltage Vf across the LED or LED group. With respect to the application of such current pulses, such a current pulse may have, in the numeric example as given above, a duration of 26 μsec.

With respect to the application of current pulses to indicate the start of a modulation time window, it may be pointed out that additional synchronisation instants may be obtained, e.g. in case the LED driver does not operate in a continuous current mode, whereby the LED driver provided in a substantially constant current during the entire modulation time window MTW, as e.g. shown in FIG. 5, but whereby the LED driver operates in a duty cycle mode, as e.g. shown in FIG. 6. In case the LED driver operates in duty cycle mode, the start of each sub-window may be apparent from the rising edge of the supply current, i.e. at instants t=0, t=t1, t=t2 in FIG. 6.

Phase Synchronisation

Within the meaning of the present invention 'phase synchronisation' is the term used to synchronize the second control unit to the first control unit in such manner that they both work together to achieve the same overall purpose in each separate modulation cycle, period or sub-period etc. This can be illustrated by the following scheme, Whereby:
FCU=first control unit,
SCU=second control unit,
LG1=LED group 1, LG2=LED group 2, and so on.

Assuming we have a modulation time window that is subdivided into 4 sub-windows or time slots, whereby, during each time slot, the required current needs to be generated.

The following operating scheme or sequence can be considered an erroneous synchronisation or out-of-phase synchronisation:
FCU: |LG1|LG2|LG3|LG4|LG1| etc
SCU: |LG2|LG3|LG4|LG1|LG2| etc As can be seen from the scheme, in a first time slot, the FCU performs control actions for the LG1, while the SCU performs control actions for the LG2.

In case the FCU controls the LED driver and the SCU controls the switching assembly of the light engine, this situation would correspond to the FCU enabling the LED driver to generate, in the first time slot, the desired current for LED group 1 (LG1), while the SCU controls the switching assembly such that the supply current (intended for LG1) is provided to LG2.

As will be understood, this would not result in an illumination corresponding to a desired illumination as indicated by a received set point.

The appropriate operating scheme or sequence would have to be:
FCU: |LG1|LG2|LG3|LG4|LG1| etc
SCU: |LG1|LG2|LG3|LG4|LG1| etc In order to ensure that the control units are phase synchronised, in an embodiment, a message may be sent via the serial communication line from the first control unit to the second control unit to identify the purpose or period the first control unit is working on, for example LG2.

The second control unit then adapts its actions to also work on overall purpose P2. After a larger time (e.g. 100 milliseconds dependent on implementation details, mainly depending on how long the controllers stay in sync) this sync message may be repeated.

It may further be noted that, when both control units are in frequency synchronisation, they can work for a comparatively long time in phase synchronisation without actively re-syncing them. For the time-frames given above, whereby the modulation time window is e.g. 3.3 or 6.6. msec, it may be sufficient to re-synchronise (i.e. re-sync) every 100 msec.

In an embodiment, the present invention provides in a light engine comprising an LED assembly configured to receive a supply current from an LED driver, the LED assembly comprising a plurality of LEDs and one or more switches arranged in series or in parallel with one or more LEDs of the plurality of LEDs. The light engine further comprises a control unit configured to control the one or more switches of the LED assembly, thereby controlling an LED current through the plurality of LEDs; the control unit is further configured to:
  receive, at an input terminal, a set point representing a desired illumination characteristic of an LED assembly of the light engine
  determine, based on the received set point, a current amplitude modulation scheme and a duty cycle modulation scheme;
  output a first output signal representative of the current amplitude modulation scheme for processing by an LED driver control unit of the LED driver;
  wherein the current amplitude modulation scheme represents an amplitude of the supply current to be provided by the LED driver as a function of time within a modulation time window and the duty cycle modulation scheme represents switching operations for the one or more switches as a function of time within the modulation time window and wherein the current amplitude modulation scheme and the duty cycle modulation scheme are configured to, when applied by the LED driver control unit and the control unit, to generate the desired illumination characteristic.

In accordance with an embodiment of the present invention, the current amplitude modulation scheme may e.g. be in the form of an array of set points (i.e. current set points) to be delivered by an SMPC of an LED driver to which the light engine is connected. As such, in an embodiment, the control unit of the light engine assumes the role of master control unit, controlling the switches of the LED assembly and in addition, outputs a control signal for controlling the LED driver, in particular an SMPC of the LED driver to which the light engine is connected or connectable.

The LED driver as applied in the present invention may have multiple outputs or output channels, each being capable of outputting a supply current with a particular desired amplitude. Such multiple outputs may during use e.g. be connected to a respective multiple channels or input terminals of a light engine, in order to supply multiple groups of LEDs of an LED assembly of a lighting engine.

As required, detailed embodiments of the present invention are disclosed herein: however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A modular system comprising a first component comprising an LED driver and a second component comprising a light engine, the LED driver comprising:
  a switched mode power converter configured to output a supply current;
  a first control unit configured to control a switch of the switched mode power converter, thereby controlling the supply current;
the light engine comprising:
  an LED assembly configured to receive the supply current, the LED assembly comprising a plurality of LEDs or LED groups and one or more switches arranged in series or in parallel with one or more LEDs or LED groups of the plurality of LEDs of LED groups, and
  a second control unit configured to control the one or more switches of the LED assembly, thereby controlling a supply of the supply current to the plurality of LEDs or LED groups of the LED assembly;
  wherein the first control unit and the second control unit are configured to co-operate and control the supply current and the supply of the supply current to the LED assembly in accordance with a desired illumination characteristic, and wherein the first and second control unit are configured to synchronize a switching operation of the switch of the switched mode power converter with a switching operation of the one or more switches of the light engine,
wherein the first control unit and the second control unit are configured to control the LED assembly to generate a desired illumination characteristic by controlling the switch and the one or more switches within a predetermined modulation time window and
wherein the first control unit and the second control unit are configured to synchronize the switching operation of the switch of the switched mode power converter with the switching operation of the one or more switches of the light engine by receiving a common clock signal or by exchanging a synchronization signal.

2. The modular system according to claim 1, wherein the plurality of LEDs is arranged in groups of LEDs in series, each of the groups of LEDs being provided with a switch of the one or more switches, the switch being connected in parallel to the respective group of LEDs.

3. The modular system according to claim 1, wherein the plurality of LEDs is arranged in groups of LEDs arranged in parallel, each of the groups of LEDs being provided with a switch of the one or more switches, the switch being connected in series with the respective group of LEDs.

4. The modular system according to claim 1, wherein the second control unit is configured to provide the synchronization signal to the first control unit, the second control unit being configured to reset the switch mode power converter upon receipt of the synchronization signal.

5. The modular system according to claim 1, further comprising a serial communication link for connecting the first control unit to the second control unit.

6. The modular system according to claim 1, wherein the first control unit is configured to:
  receive, at an input terminal of the first control unit, an input signal representing the desired illumination characteristic;
  determine, based on the desired illumination characteristic, a current amplitude modulation scheme, a duty cycle modulation scheme and a time-division scheme; and
  provide an output signal representative of the time-division scheme to the second control unit, wherein the first control unit is configured to apply the current amplitude modulation scheme and the duty cycle modulation scheme within the modulation time window, wherein the second control unit is configured to apply the time-division scheme within the modulation time window, in order to generate the desired illumination characteristic, and wherein the time-division scheme represents a subdivision of the modulation time window into a plurality of sub-windows, whereby each of the plurality of groups of LEDs is provided with the supply current during only one sub-window of the plurality of sub-windows.

7. The modular system according to claim 6, wherein the subdivision of the modulation time window into the plurality of sub-windows is based on a desired color of the illumination characteristic.

8. The modular system according to claim 6, wherein the sub-windows have the same duration.

9. A modular system comprising a first component comprising an LED driver and a second component comprising a light engine,
the LED driver comprising:
a switched mode power converter configured to output a supply current;
a first control unit configured to control a switch of the switched mode power converter, thereby controlling the supply current;
the light engine comprising:
an LED assembly configured to receive the supply current, the LED assembly comprising a plurality of LEDs or LED groups and one or more switches arranged in series or in parallel with one or more LEDs or LED groups of the plurality of LEDs of LED groups, and
a second control unit configured to control the one or more switches of the LED assembly, thereby controlling a supply of the supply current to the plurality of LEDs or LED groups of the LED assembly;
wherein the first control unit and the second control unit are configured to co-operate and control the supply current and the supply of the supply current to the LED assembly in accordance with a desired illumination characteristic, and wherein the first and second control unit are configured to synchronize a switching operation of the switch of the switched mode power converter with a switching operation of the one or more switches of the light engine,
wherein the first control unit and the second control unit are configured to control the LED assembly to generate a desired illumination characteristic by controlling the switch and the one or more switches within a predetermined modulation time window and wherein the modular system further comprises a serial communication link for connecting the first control unit to the second control unit.

10. The modular system according to claim 9, wherein the modulation time window is equal to 3.3 ms or a multiple thereof.

11. The modular system according to claim 9, wherein the first control unit and the second control unit are configured to synchronize a switching operation of the switch of the switched mode power converter with a switching operation of the one or more switches of the light engine by receiving a common clock signal.

12. The modular system according to claim 9, wherein the first control unit and the second control unit are configured to synchronize a switching operation of the switch of the switched mode power converter with a switching operation of the one or more switches of the light engine by exchanging a synchronization signal.

13. The modular system according to claim 12, wherein the second control unit is configured to provide the synchronization signal to the first control unit, the second control unit being configured to reset the switch mode power converter upon receipt of the synchronization signal.

14. The modular system according to claim 9, wherein the first control unit is configured to control the switch of the switched mode power converter using a modulation clock signal of the first control unit, whereby the modulation clock signal is based on a clock signal of the first control unit.

15. The modular system according to claim 9, wherein the first control unit is configured to transmit, via the serial communication link, a data element comprising a plurality of bits to the second control unit, and wherein the second unit is configured to, upon receipt of the data element, determine a duration of the transmitting of the data element and synchronize a clock signal of the second control unit based on the duration.

16. The modular system according to claim 15, wherein the data element is Manchester encoded.

17. The modular system according to claim 9, wherein the first control unit is configured to control the switched mode power supply to generate a current pulse at a predetermined period, and wherein the light engine is configured to detect a timing of the current pulse and synchronize a control of the one or more switches based on the timing of the current pulse.

18. The modular system according to claim 17, wherein the light engine comprises a measurement unit configured to perform a current measurement of the supply current or a forward voltage measurement and provide a measurement signal representing the current or forward voltage measurement to the second control unit to determine the timing of the current pulse.

19. The modular system according to claim 9, wherein the second control unit is configured to:
receive, at an input terminal of the second control unit, an input signal representing the desired illumination characteristic;
determine, based on the desired illumination characteristic, a current amplitude modulation scheme a duty cycle modulation scheme; and
provide an output signal representative of the current amplitude modulation scheme to the first control unit, wherein the first control unit and the second control unit are respectively configured to apply the current amplitude modulation scheme and the duty cycle modulation scheme within the modulation time window, in order to generate the desired illumination characteristic, and
wherein the first control unit and the second control unit are configured to perform a frequency synchronization and a phase synchronization of the current amplitude modulation scheme, the duty cycle modulation scheme and the time-division scheme.

20. The modular system according to claim 19, wherein the second control unit is configured to perform the phase synchronization based on a signal received from the first control unit, via the serial communication link.

21. The modular system according to claim 9, wherein the second control unit is configured to determine a timing of the switching operation of the switch of the switched mode power converter based on a current measurement of the supply current.

22. The modular system according to claim 21, wherein the light engine comprises a measurement unit configured to perform a current measurement of the supply current and provide a current measurement signal representing the current measurement to the second control unit to determine the timing of the switching operation of the switch.

\* \* \* \* \*